C. S. HATHAWAY.
PROCESS OF MAKING FIREPROOFING MATERIAL AND HEAT AND COLD RETAINING COVERINGS AND PRODUCT THEREOF.
APPLICATION FILED MAR. 24, 1920.
1,374,885.
Patented Apr. 12, 1921.
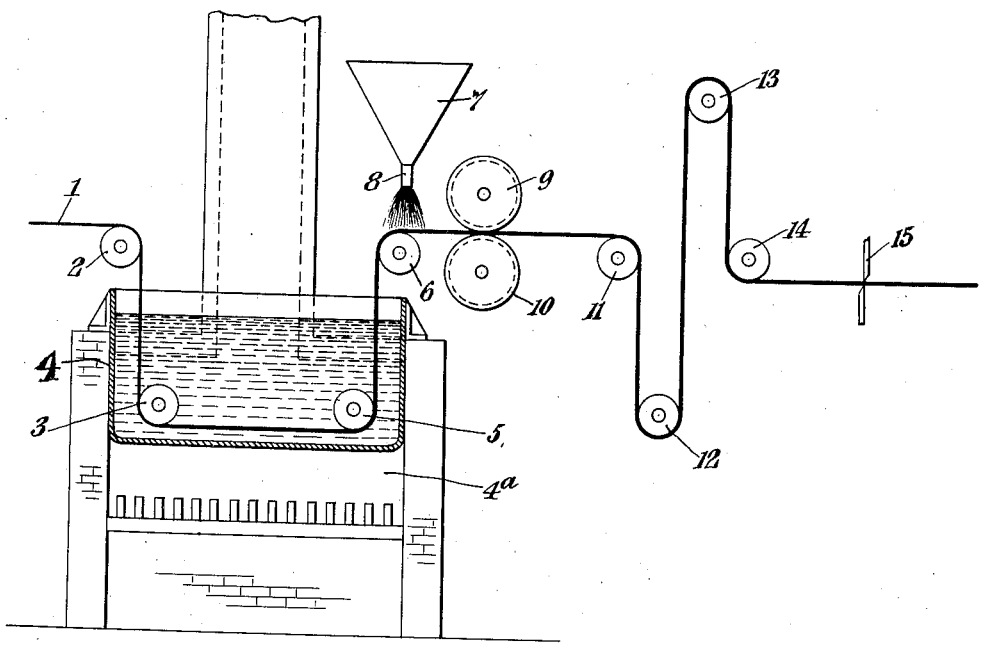

UNITED STATES PATENT OFFICE.

CHESTER S. HATHAWAY, OF QUINCY, MASSACHUSETTS, ASSIGNOR TO JOSEPH A. LOCKE, OF BOSTON, MASSACHUSETTS.

PROCESS OF MAKING FIREPROOFING MATERIAL AND HEAT AND COLD RETAINING COVERINGS AND PRODUCT THEREOF.

1,374,885.     Specification of Letters Patent.     Patented Apr. 12, 1921.

Application filed March 24, 1920. Serial No. 368,282.

*To all whom it may concern:*

Be it known that I, CHESTER S. HATHAWAY, a citizen of the United States, residing at Quincy, in the county of Norfolk and State of Massachusetts, have invented a certain new and useful Improvement in Processes of Making Fireproofing Material and Heat and Cold Retaining Coverings and Product Thereof, of which the following is a specification.

My invention relates to a process of producing fireproofing material and the product thereof which is applicable to many and varied uses.

The object of my invention is to provide a process for the production of fireproofing materials, but especially fireproof roofing and the product thereof so as to obtain a material which is weather proof, fireproof, resistant to the action of gases, heat and electrolysis, and so dense and hard that it will even withstand cutting with an ordinary chisel when cold. The object of my invention is especially to provide a product made from a composition which is extraordinarily resistant to attacks of various kinds as it contains for its base, water gas tar and preferably the lightest grade thereof. Another object is to utilize in such a composition materials which will effectively dry the water gas tar, notwithstanding the high percentage of water contained therein, and to provide substances which will enable the water gas tar to become effectively and homogeneously mixed with the other constituents present.

Further objects of my invention will appear from the detailed description thereof contained hereinafter.

While my invention is capable of embodiment in many different forms for the purpose of illustration I shall describe only one form thereof hereinafter, and while it is capable of being carried out in connection with many different types of apparatus, I have shown only one type of apparatus for use in connection therewith in the accompanying drawings, in which—

The figure is a diagrammatic representation of an apparatus which may be used in accordance with my invention.

In case fireproofing coverings are to be made, a woven fabric 1 of any desired character, as for example, burlap, is passed over an idler roll to and thence downwardly beneath an idler roll 3 located in a vat 4 heated from a fire pot 4ᵃ containing a quantity of a coating and impregnating material, through which the fabric 1 is run in a horizontal direction until it passes out of the vat 4 by passing under an idler roll 5. The impregnating and coating material, may be comprised for example of—

½ bbl. Portland cement,
30 lbs. asbestos fiber,
15 lbs. precipitated resinate of manganese,
3 gals. water gas tar which may be any grade of the tar that collects in the gas mains of a water gas plant but which is preferably the upper one-half of the tar layer which is there collected and which contains 40 to 60% water,
1 gal. menhaden oil, preferably crude,
4 gals. naphtha or benzin.

The resinate of manganese may be omitted, if desired. The above are ground together in a water cooled mill or any other desired type of mill. The naphtha or benzin is used as a solvent of the resinate of manganese and these two constituents are valuable in bringing about the mixing of the Portland cement with the water gas tar. The asbestos fiber provides flexibility and strength to the composition and the menhaden oil is an oily vehicle for the same. The Portland cement takes up the water from the water gas tar as well as from any other constituents containing water. After the above constituents are ground together, there are added thereto:
25 gals. water gas tar of the same grade,
22 gals. raw menhaden oil, preferably crude,
1 gal. silicate of soda.

If desired, before the grinding, colors may be introduced and driers may be introduced after the grinding to any desired extent. Also any desired benzin drier may be added, The silicate of soda acts as a fireproofing constituent and a thickening and hardening material.

After the fabric has been impregnated and coated in this manner it passes over an idler roll 6 and extends thence in a horizontal direction beneath a hopper 7 having a slit 8 in its lower position so as to sift onto the coated fabric a mixture containing:

30 lbs. asbestos fiber, and
96 lbs. Portland cement, said mixture being fed onto the fabric in the ratio of 126 pounds thereof to 50 gals. of the impregnating and coating composition taken up by the fabric which would be taken up by 400 square feet of the burlap. From this point the fabric passes between two sets of internally heated calender rolls 9 and 10 where the fabric is subjected to considerable pressure and heat so as to make the asbestos fiber and Portland cement integral with the same, and so as to make the entire coated fabric compact and hard and free from any unfilled interstices. After leaving the calender rolls 9 and 10 the coated fabric is run over a number of idlers 11, 12, 13 and 14 and is then cut into sections of the final size and shape desired by means of a cutter 15 and while the coated fabric is still hot, inasmuch as the roofing material thus produced can only be cut with the greatest difficulty when cold.

Fireproofing material made in this manner can be used in any desired manner, but is especially applicable for the covering of roofs, for which purpose it may be applied in any of the usual ways that roofs are covered. It is to be understood, however, that the material may be used for protecting many different surfaces of various kinds other than roofs.

In case a heat and cold retaining covering is to be made the same apparatus is used except that the hopper 7 is omitted. A coating and impregnating material is applied to a web of heavy brown paper, which material may be comprised of—

100 lbs. magnesia,
200 lbs. asbestos short fiber,
1 bbl. Portland cement,
10 gals. soya bean oil,
5 gals crude menhaden oil,
5 gals. water gas tar of the same grade,
4 gals. of a solution of 30–36 parts by weight of sodium silicate in 70–64 parts by weight of water,
5 gals. any desired benzin drier,
50 lbs. rosin.

All these constituents should be mixed together thoroughly and heated to the boiling point and applied to the paper at this temperature. The coated paper runs through the heated calender rolls 9 and 10 to subject the coated material to pressure, and thence over the idlers 11, 12, 13 and 14 to permit the fabric to dry. The product may be cut while hot by the cutter 15.

In the above compositions a drier that may be used is made as follows:

1 gal. benzin,
½ pt. soya bean oil,
32 ozs. manganese dioxid.

While I have described my invention above in detail, I wish it to be understood that many changes may be made without departing from the spirit thereof.

I claim:

1. The process which comprises impregnating a fabric with an impregnating composition containing a tar and an hydraulic cement.

2. The process which comprises impregnating a fabric with an impregnating composition containing a water gas tar and an hydraulic cement.

3. The process which comprises impregnating a fabric with an impregnating composition containing a tar, an hydraulic cement, resinate of manganese and a solvent for the resinate of manganese.

4. The process which comprises impregnating a fabric with an impregnating composition containing a water gas tar, an hydraulic cement, resinate of manganese and a solvent for the resinate of manganese.

5. The process which comprises impregnating a fabric with an impregnating composition containing a tar, an hydraulic cement, resinate of manganese, a solvent for the resinate of manganese, an oil asbestos fiber and silicate of soda.

6. The process which comprises impregnating a fabric with an impregnating composition containing a water gas tar, an hydraulic cement, resinate of manganese, a solvent for the resinate of manganese, an oil, asbestos fiber and silicate of soda.

7. The process which comprises impregnating a fabric with a tar and an hydraulic cement, then applying to the surface of the impregnated fabric asbestos and cement, and subjecting the same to pressure.

8. The process which comprises impregnating a fabric with a water gas tar and an hydraulic cement, then applying to the surface of the impregnated fabric asbestos and cement, and subjecting the same to pressure.

9. The process which comprises impregnating a fabric with a tar, an hydraulic cement, resinate of manganese and a solvent for the resinate of manganese, then applying to the surface of the impregnated fabric asbestos and cement, and subjecting the same to pressure.

10. The process which comprises impregnating a fabric with a water gas tar, an hydraulic cement, resinate of manganese and a solvent for the resinate of manganese, then applying to the surface of the impregnated fabric, asbestos and cement, and subjecting the same to pressure.

11. The process which comprises impregnating a fabric with a tar, an hydraulic cement, resinate of manganese, a solvent for the resinate of manganese, an oil, asbestos fiber and silicate of soda, then applying to the surface of the impregnated fabric asbestos and cement, and subjecting the same to pressure.

12. The process which comprises impregnating a fabric with a water gas tar, an hydraulic cement, resinate of manganese, a solvent for the resinate of manganese, an oil, asbestos fiber and silicate of soda, then applying to the surface of the impregnated fabric asbestos and cement, and subjecting the same to pressure.

13. An article of manufacture comprising a fabric impregnated with an impregnating composition containing a tar and an hydraulic cement.

14. An article of manufacture comprising a fabric impregnated with an impregnating composition containing a water gas tar and an hydraulic cement.

15. An article of manufacture comprising a fabric impregnated with a tar, an hydraulic cement, resinate of manganese and a solvent for the resinate of manganese.

16. An article of manufacture comprising a fabric impregnated with an impregnating composition containing a water gas tar, an hydraulic cement, resinate of manganese and a solvent for the resinate of manganese.

17. An article of manufacture comprising a fabric impregnated with an impregnating composition containing a tar, an hydraulic cement, resinate of manganese, a solvent for the resinate of manganese, an oil, asbestos fiber and silicate of soda.

18. An article of manufacture comprising a fabric impregnated with an impregnating composition containing a water gas tar, an hydraulic cement, resinate of manganese, a solvent for the resinate of manganese, an oil, asbestos fiber and silicate of soda.

19. An article of manufacture comprising a fabric impregnated with a tar and an hydraulic cement, said impregnated fabric carrying upon its surface a mixture of asbestos and Portland cement.

20. An article of manufacture comprising a fabric impregnated with a water gas tar and an hydraulic cement, said impregnated fabric carrying upon its surface a mixture of asbestos and Portland cement.

21. An article of manufacture comprising a fabric impregnated with a tar, an hydraulic cement, resinate of manganese and a solvent for the resinate of manganese, said impregnated fabric carrying upon its surface a mixture of asbestos and Portland cement.

22. An article of manufacture comprising a fabric impregnated with a water gas tar, an hydraulic cement, resinate of manganese and a solvent for the resinate of manganese, said impregnated fabric carrying upon its surface a mixture of asbestos and Portland cement.

23. An article of manufacture comprising a fabric impregnated with a tar, an hydraulic cement, resinate of manganese, a solvent for the resinate of manganese, an oil, asbestos fiber and silicate of soda, said impregnated fabric carrying upon its surface a mixture of asbestos and Portland cement.

24. An article of manufacture comprising a fabric impregnated with a water gas tar, an hydraulic cement, resinate of manganese, a solvent for the resinate of manganese, an oil, asbestos fiber and silicate of soda, said impregnated fabric carrying upon its surface a mixture of asbestos and Portland cement.

In testimony that I claim the foregoing, I have hereunto set my hand this 15th day of March, 1920.

CHESTER S. HATHAWAY.